G. T. D. BARNJUM & W. F. DIAL.
TREADLE.

No. 172,953. Patented Feb. 1, 1876.

WITNESSES:
Chas. Nida
J. Goethals

INVENTOR:
G. T. D. Barnjum
W. F. Dial
BY
ATTORNEYS.

UNITED STATES PATENT OFFICE.

GEORGE T. D. BARNJUM, OF BOSTON, MASSACHUSETTS, AND WILBUR F. DIAL, OF MONTREAL, CANADA.

IMPROVEMENT IN TREADLES.

Specification forming part of Letters Patent No. 172,953, dated February 1, 1876; application filed January 3, 1876.

*To all whom it may concern:*

Figure 1:
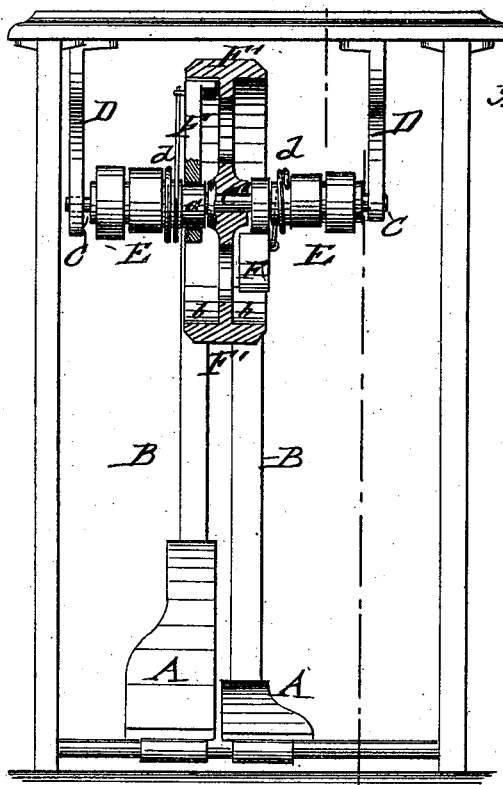
Figure 2:
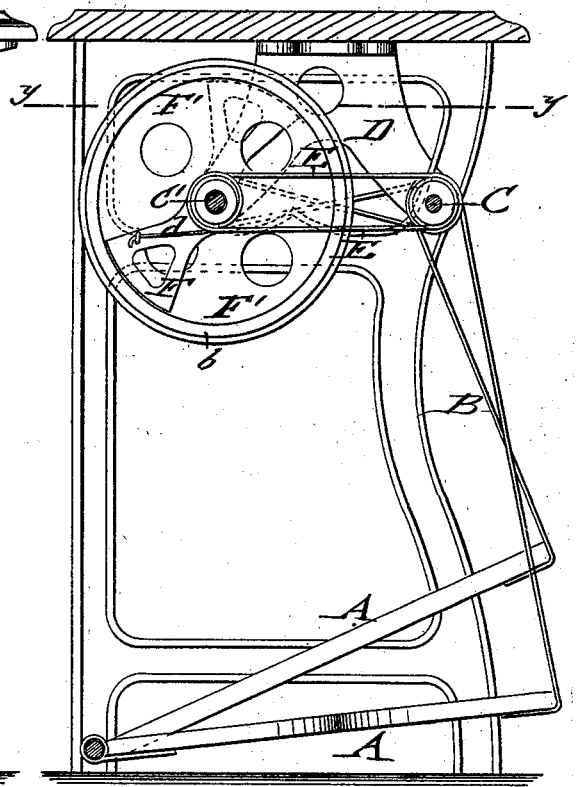
Figure 3:
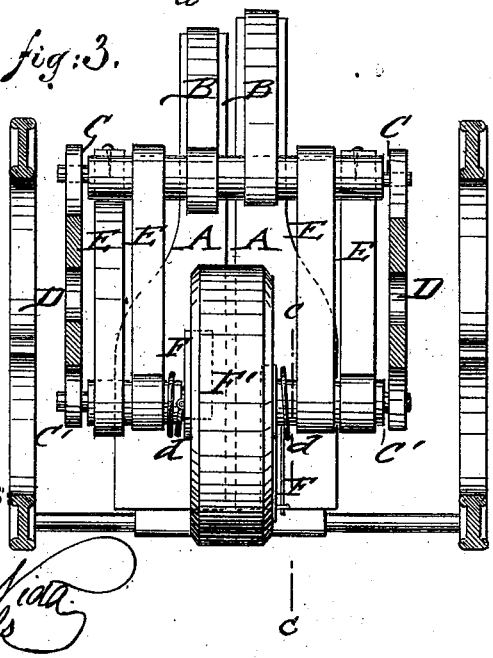
Figure 4:
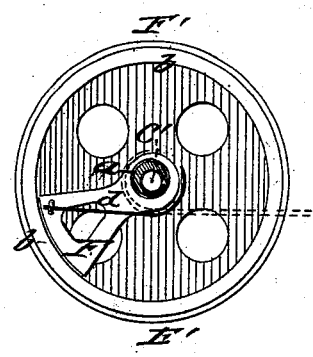

Be it known that we, GEORGE T. D. BARNJUM, of Boston, in the county of Suffolk and State of Massachusetts, and WILBUR F. DIAL, of Montreal, in the Province of Quebec and Dominion of Canada, have invented a new and Improved Treadle-Motion, of which the following is a specification:

In the accompanying drawing, Figure 1 represents a front elevation, partly in section, on line *c c*, Fig. 3, of our improved treadle-motion; Fig. 2, a side view, partly in section, on line *x x*, Fig. 1; Fig. 3, a horizontal section of the same on the line *y y*, Fig. 2; and Fig. 4 is a detail side view of the fly-wheel with the actuating eccentric clutches.

Similar letters of reference indicate corresponding parts.

Our invention relates to an improved treadle-motion for sewing-machines, lathes, scroll-saws, and other light machinery, by which the use of the crank and balance-wheel may be dispensed with, and a higher rate of speed obtained at less expenditure of force than in the present motions in use.

The invention consists of alternately-swinging treadles, connected by belts with an intermediate reciprocating shaft, that operates alternately, by belts, in opposite direction, loose sleeves with end eccentrics, which engage clutches for imparting, by their alternately-reciprocating action, continuous rotary motion to a flanged fly-wheel.

In the drawing, A represents two alternately-swinging treadles that are connected by strong belts B applied to the rear ends of the treadles to a shaft, C, that is hung to a supporting-frame, D, secured to the under side of the table of the machine to be driven by our treadle-motion.

The belts B are wound in opposite direction on shaft C, and attached at the ends to the same, for the purpose of imparting reciprocating rotary motion to shaft C, which is again connected at both sides of the treadle-belts with two additional belts, E, that are attached and wound in opposite direction to shaft C, and to sleeves E', which are placed on a second shaft, C', hung to the front part of frame D.

The belts E, at one side of the treadle-belts, turn their sleeve E' in one direction, while the belts at the other side turn their sleeves simultaneously in opposite direction, they being, for this purpose, crossed diagonally.

An eccentric, *a*, at the end of each sleeve E', engages an encircling band of the sector-shaped arm or clutch F, which is forced by the eccentricity of the revolving sleeve against the circumferential flange *b* of the fly-wheel F' keyed to shaft C'. The reciprocating rotary motion that is alternately imparted by the belt-connection with shaft C to the sleeves, actuates also the clutches alternately in opposite direction, each clutch throwing the fly-wheel in one direction, while the other clutch is returned, so that a continuous rotary motion of the same is obtained. The return of the clutches is assisted and accelerated by suitable springs *d* that are attached to the clutch ends and sleeves.

The treadles may be started from any position, as there is no crank-connection that requires to be thrown off the centers.

The fly-wheel can only be revolved in one direction as soon as power is applied to the treadles, which makes the device specially useful to sewing and other machines, where the motion must be always in the same direction, while the speed and power that may be imparted make the machine applicable to lathes, scroll-saws, and similar machinery.

Having thus described our invention, we claim as new and desire to secure by Letters Patent—

A treadle motion composed of alternately-swinging treadles, connected by an intermediate reciprocating shaft and belts, wound in opposite direction with simultaneously reciprocating sleeve-eccentrics and clutches of the fly-wheel shaft to actuate a flanged fly-wheel, and impart continuous rotary motion to the same, substantially in the manner and for the purpose set forth.

GEORGE THOMAS DIXIE BARNJUM.
WILBUR FISKE DIAL.

Witnesses:
R. BERRY,
GEO. FLANAGAN.